(12) United States Patent
Herpel et al.

(10) Patent No.: US 7,623,573 B2
(45) Date of Patent: Nov. 24, 2009

(54) METHOD AND APPARATUS FOR STORING OR TRANSMITTING CODING PARAMETERS SEPARATELY FROM CODED AUDIO-VISUAL DATA

(75) Inventors: Carsten Herpel, Wennigsen (DE); Harald Schiller, Hannover (DE); Ralf Ostermann, Hannover (DE); Edgar Peters, Sarstedt (DE); Axel Kochale, Springe (DE)

(73) Assignee: Thomson Licensing, Boulogne Billancourt (FR)

( * ) Notice: Subject to any disclaimer, the term of this patent is extended or adjusted under 35 U.S.C. 154(b) by 970 days.

(21) Appl. No.: 10/522,089

(22) PCT Filed: Jul. 12, 2003

(86) PCT No.: PCT/EP03/07561

§ 371 (c)(1),
(2), (4) Date: Jan. 21, 2005

(87) PCT Pub. No.: WO2004/010699

PCT Pub. Date: Jan. 29, 2004

(65) Prior Publication Data

US 2006/0133473 A1 Jun. 22, 2006

(30) Foreign Application Priority Data

Jul. 22, 2002 (EP) .................................. 02016422

(51) Int. Cl.
*H04N 7/12* (2006.01)
*H04N 7/14* (2006.01)
(52) U.S. Cl. .................. 375/240.01; 348/14.13
(58) Field of Classification Search ............... None
See application file for complete search history.

(56) References Cited

U.S. PATENT DOCUMENTS 5,640,208 A    6/1997    Fujinami (Continued)

FOREIGN PATENT DOCUMENTS

EP    1073223    1/2001

(Continued)

OTHER PUBLICATIONS

M.M. Hannuksela, Y.K. Wang: "Coding of Parameters Sets—Document: JVT-C078)" Joint Video Team (JVT) of ISO/IEC MPEG 7 ITU-T VCEG (ISO/IEC JTC1/SC29/WG11 and ITU-T SG16 Q.6), May 6-10, 2002, pp. 1-13.

(Continued)

*Primary Examiner*—Gims S Philippe
(74) *Attorney, Agent, or Firm*—Robert D. Shedd; Robert B. Levy (57) ABSTRACT

Compression parameter sets are stored in files separate from the main AV or transmitted separately and prior to any subsequent transmission of AV data. The scope of parameter set identifiers is limited to not more than a Program Chain. Either existing files are extended by including the compression parameter sets directly, or separate files containing the compression parameter sets are created. In order to support easy authoring of compound content, it is proposed to amend each compression parameter set or groups of such parameter sets with scope period information, which can be based on time stamps, on file names, or on sector numbers on the disc. It is additionally proposed to employ an indirect referencing mechanism, where parameter set identifiers are referring to secondary tables, and where the entries of secondary tables are defined to be themselves identifiers referring in turn to entries of a common parameter set table provided once.

9 Claims, 7 Drawing Sheets

U.S. PATENT DOCUMENTS

| | | | |
|---|---|---|---|
| 5,926,208 A * | 7/1999 | Noonen et al. | 348/14.13 |
| 6,100,940 A | 8/2000 | Dieterich | |
| 6,493,028 B1 * | 12/2002 | Anderson et al. | 348/222.1 |
| 2001/0031009 A1 | 10/2001 | Knee et al. | |

FOREIGN PATENT DOCUMENTS

| | | |
|---|---|---|
| EP | 1102276 | 5/2001 |
| EP | 1193899 | 4/2002 |
| FR | 2809573 | 11/2001 |
| WO | WO 01/69936 | 9/2001 |

OTHER PUBLICATIONS

J. Hunter et al.: "A comparison of schemas for video metadata representation", Computer Networks, Elsevier Science Publishers, B. V.; Amsterdam. NL, vol. 31, No. 11-16, May 17, 1999, pp. 1431-1451.

T. Suzuki, N. Oishi, Y. Yagasaki: Group of Pictures for JVT Codec—(Document JVT-B069), Joint Video Team (JVT) of ISO/IEC MPEG & ITU-T VCEG (ISO/IEC JTC1/SC29/WG11 and ITU-T SG16 Q.6), Jan. 29, 2002-Feb. 1, 2002, pp. 1-7.

Search Report Dated Oct. 13, 2003.

* cited by examiner

PGCI File

| |
|---|
| Header<br>Other Inofrmation occuring only once |
| Information per Program Chain (PGC)<br>..<br>Start Address of PGC<br>Global Parameter Sets (GP) with PGC scope |
| Information per Cell<br>..<br>Start Address of Cell<br>PS with Cell scope |
| Information per Video Object Unit (VOBU)<br>..<br>Start Address of VOBU<br>PS with VOBU scope |

| PS1 Scope Period Info | PS2 Scope Period Info | PS3 Scope Period Info |

METHOD AND APPARATUS FOR STORING OR TRANSMITTING CODING PARAMETERS SEPARATELY FROM CODED AUDIO-VISUAL DATA

This application claims the benefit, under 35 U.S.C. §365 of International Application PCT/EP03/07561, filed Jul. 12, 2003, which was published in accordance with PCT Article 21(2) on Jan. 29, 2004 in English and which claims the benefit of European patent application No. 02016422.4, filed Jul. 22, 2002.

The invention relates to a method and to an apparatus for storing and transmitting coding parameters separately from coded audio-visual data.

BACKGROUND

In the field of compressing audio-visual (AV) data the technological trend goes towards increasingly parameter-oriented descriptions. Seen from an encoding point of view, compression parameters in general specify, in which of several possible modes certain parts of the encoder input (AV data) shall be processed. Correspondingly, from a decoding point of view, those same compression parameters indicate, according to which of several allowable rules a section of a given compressed bit stream shall be converted back into a piece of AV data. Compression parameters can be of different nature; assuming a compression scheme where pictures are sub-divided into slices, they may be "global parameters (GP)", "picture layer parameters (PLP)" and "slice layer parameters (SLP)". It is expected that GP are mostly constant, since they express parameters such as picture size or color space. However, they could be changed at the start of a random access unit, such as a GOP. Therefore, a small set of different GP sets will be referenced from within an AV bit stream. PLPs express parameters that might change more frequently, at a maximum on a per-picture basis. Hence, each coded picture will reference one out of a potentially larger set of such PLPs. Similarly, different SLPs could be referenced by each coded slice within a coded picture. It is expected that GP are mostly predetermined by the nature of the specific AV material being compressed, whereas PLP and SLP can be freely chosen as part of the encoder optimization. For the latter, the selection is likely to be based on some kind of compression efficiency measure quantifying either the coding error or the compression bit rate or both. The above-mentioned technology will be used in the developing MPEG-4 Part 10, also known as H.26L or JVT codec.

INVENTION

The invention is based on the recognition of the following facts.

In addition to specifying and appropriately selecting the compression parameters, they themselves must in most cases be transmitted or stored along with the AV data proper, in order to allow a meaningful decoding. This task needs to be tackled separately for each application domain, wherein the transmission or storage of compression parameters has to fulfil several, partly conflicting requirements.

Compactness:

On a global as well as local level, compression parameter description must be kept compact, such that the total bandwidth needed for AV plus parameters does not outweigh any gain in compression efficiency achieved by a parameterized approach. This includes a strong motivation to avoid any unnecessary repetition or other redundancy present in the compression parameters.

Consequently, the indexing mechanism from a coded picture or slice to the parameter set(s) will limit the number of parameter sets of each type that can be addressed, in order to reach the compactness goal. Hence, it must be specified whether or when it is possible that two different parameter sets are identified by the same parameter set identifier (numeric or other label). In other words, a name scope for the parameter set identifiers needs to be established.

Decodability:

With AV data, especially on a storage medium, being prone to be accessed in non-sequential, random ways, any parameter set allocation scheme must ensure that all required compression parameters are made available when entering and decoding a bit stream at any of its entry points. This includes the important cases of any kind of trick play, and may entail allowing certain controlled forms of data redundancy.

Compatibility:

When designing an extension of an existing specification, such as DVD for optical storage, it is desirable to maintain as many as possible of the well-understood and established system concepts. Solutions taking this into account are likely to be judged favorably in the standardization process.

Therefore, a problem to be solved by the invention is to store/transmit compression parameter sets optimized for bit rate and compatibility to the logical structures used in the application domain.

This problem is solved by the method disclosed in claim 1. An apparatus that utilizes this method is disclosed in claim 6. A corresponding decoding method and apparatus is claimed in claim 7 and 8, respectively.

According to the inventive method a number of compression parameter sets being referenced from within the coded data used. The compression parameter sets are stored in auxiliary data files that are uniquely associated to the file or stream containing the main AV bit stream. Identifiers of the compression parameter sets and the corresponding references to these identifiers in the main AV bit stream are unique within said auxiliary data files and associated file or stream containing the main AV bit stream.

Advantageously, the existing auxiliary data files related to the file or stream containing the main AV bit stream are extended to carry the compression parameter sets.

Advantageously, an additional isomorphic set of auxiliary data files for said file or stream containing the main AV bit stream is created to carry additional information such as said compression parameter sets, as to not sacrifice compatibility with older equipment not being able to process extensions to existing auxiliary data files.

Furthermore, it is of advantage that the validity period of said compression parameter set identifiers is explicitly signalled.

Advantageously, the signalling of the validity period of the compression parameter set identifiers is based on the presentation or decoding time information associated to portions of the main AV bit stream. However, the signalling of the validity period of the compression parameter set identifiers may also be based on the file names associated to portions of the main AV bit stream. Also, the signalling of the validity period of the compression parameter set identifiers may be based on an existing identification of the underlying transport or storage entities, such as packets or sectors, associated to portions of the main AV bit stream carried therein.

According to a further advantageous embodiment the compression parameter sets are referenced indirectly, wherein a. the parameter set identifiers in the AV bitstream of each of a set of parts of AV material are defined to refer to entries of a secondary table;

b. the secondary table is individually available per each part, and is stored in auxiliary files in a data structure which is repeated per each part;

c. entries of all secondary tables of said AV material are defined to be themselves identifiers referring in turn to entries of a common parameter set table provided once per said AV material.

Further advantageous embodiments of the invention result from the following description.

DRAWING

Exemplary embodiments of the invention are described with reference to the accompanying drawings, which show in.

EXEMPLARY EMBODIMENTS

Figure 1:
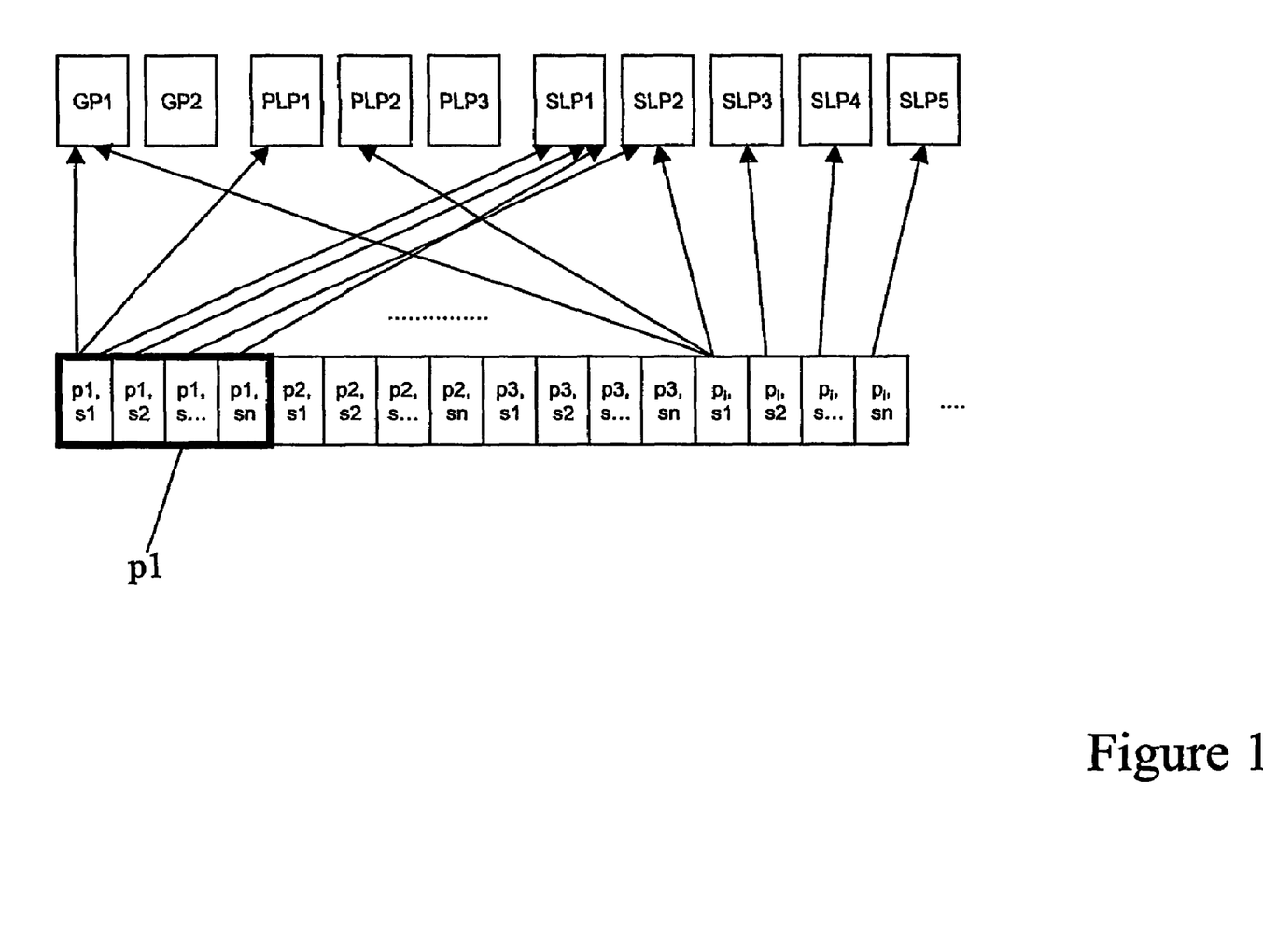
FIG. 1 an AV stream with separate parameter sets.

For video compression schemes such as MPEG-4 Part 10, compression parameter sets are generated during the video encoding process, are stored separate from the main AV bit stream and then are being referenced from there, as shown in FIG. 1. An individually accessible data unit (IADU) of an AV stream with separately generated parameter sets comprises pictures p1, p2, p3, pi, . . . each subdivided into slices s1, s2, . . . , sn. For the slices there are pointers to separately generated compression parameters, exemplarily, to global parameters GP1 and GP2, picture layer parameters PLP1, PLP2 and PLP3, and slice layer parameters SLP1, SLP2, SLP3, SLP4 and SLP5.

The IADU commonly starts with an entry picture p1 (intra-coded frame) that is decodable independent from any other data in the AV bit stream, with the exception of the reference to the needed parameter sets, e.g. one reference each to a global parameter GP1, a picture layer parameter PLP1 and slice layer parameters SLP1, SLP2 for each coded slice within the picture.

Figure 2:
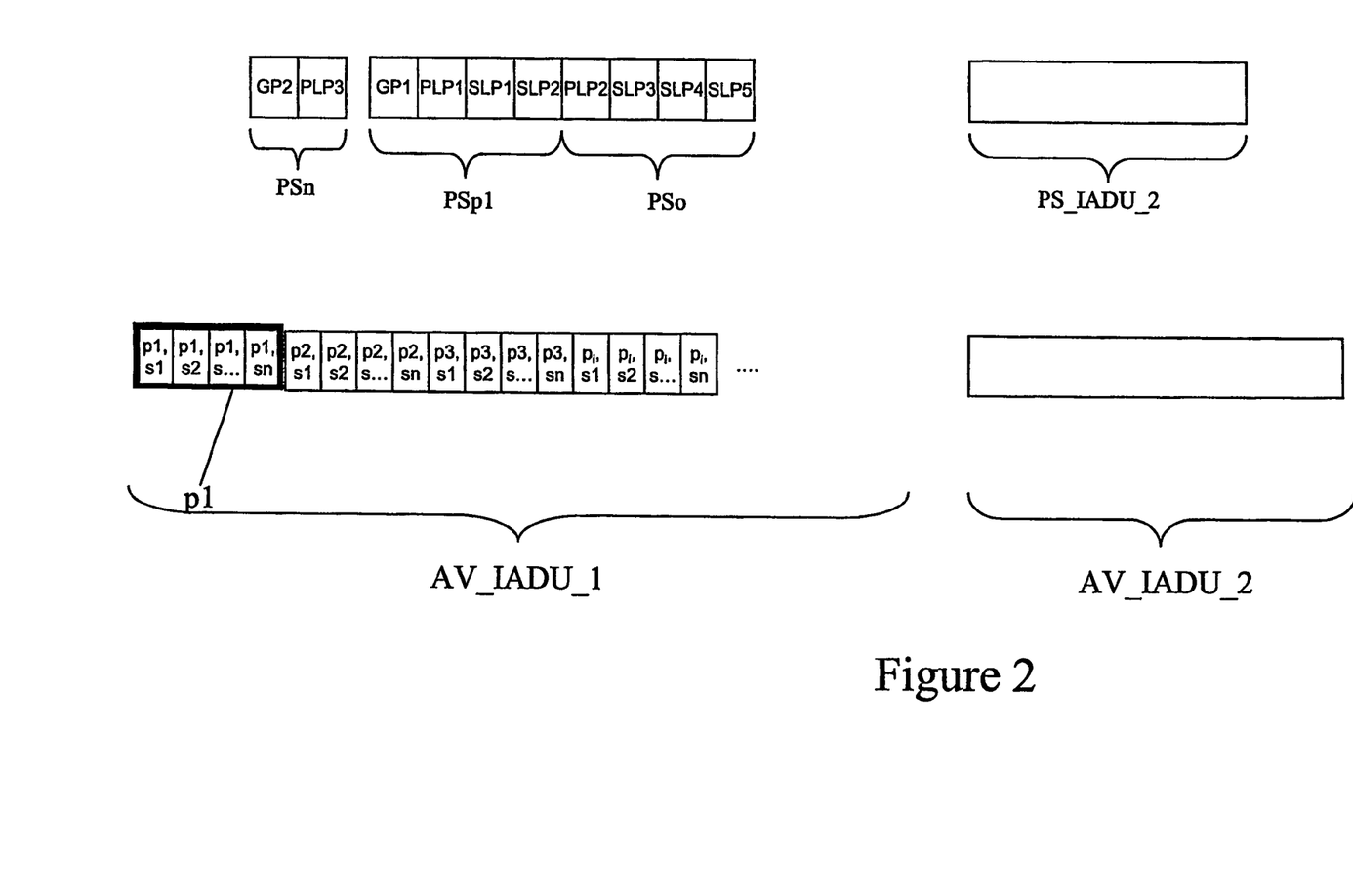
FIG. 2. an AV stream with out-of-band parameter sets modelled after the AV data.

As depicted in FIG. 2 compression parameter sets are is stored out-of-band, i.e. in a file or set of files separate from the main AV file (equivalently: to transmit the parameter sets separately and prior to any subsequent transmission of AV data). Exemplarily shown are two IADUs with the AV data AV_IADU_1 of the first IADU and AV_IADU_2 of the second IADU. The parameter sets are located out-of-band with paramter sets PSp1 referenced in entry picture p1 of IADU 1 followed by parameter sets PSo referenced in other pictures of IADU 1. Also shown are parameter sets PSn referenced in none of the IADUs and parameter sets PS_IADU_2 referenced in IADU 2.

Preferably, the internal structure of such a parameter set file/stream should closely follow that of the AV data it is related to, as shown in FIG. 2. Typically, the parameter set identifiers must remain unique within an "encoding session". In other words, the same identifier cannot be used for two different parameter sets within the encoding session. Hence, the encoding session constitutes the scope of these identifiers.

Figure 3:
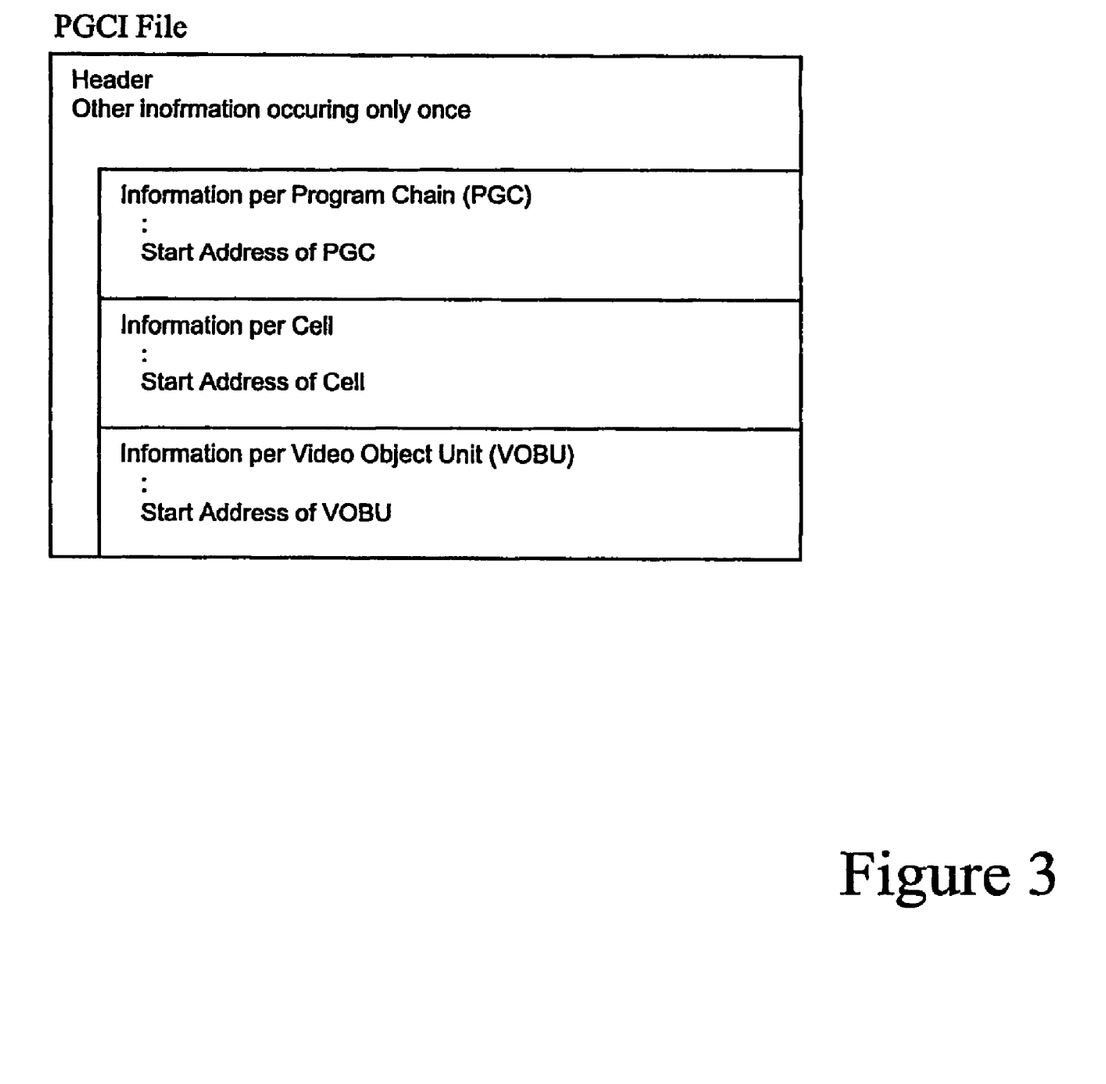
FIG. 3. the internal structure of PGCI Files existing in DVD.

An "encoding session" is mapped to meaningful entities on a storage medium, such as DVD, as follows: DVD identifies a hierarchy of semantic entities, among them "Program Chain", "Cell" and "Video Object Unit (VOBU)". In order to minimize unnecessary repetition of parameter sets, the scope of the parameter set identifiers is limited to the biggest possible of these entities. In DVD, Information about entities constitutes part of Navigation Data, and is assembled in the "Video Manager Information (VMGI)" and "Video Title Set Information (VTSI)" files, to be commonly called PGCI files hereafter. FIG. 3 shows the internal structure of these PGCI files.

Figure 4:
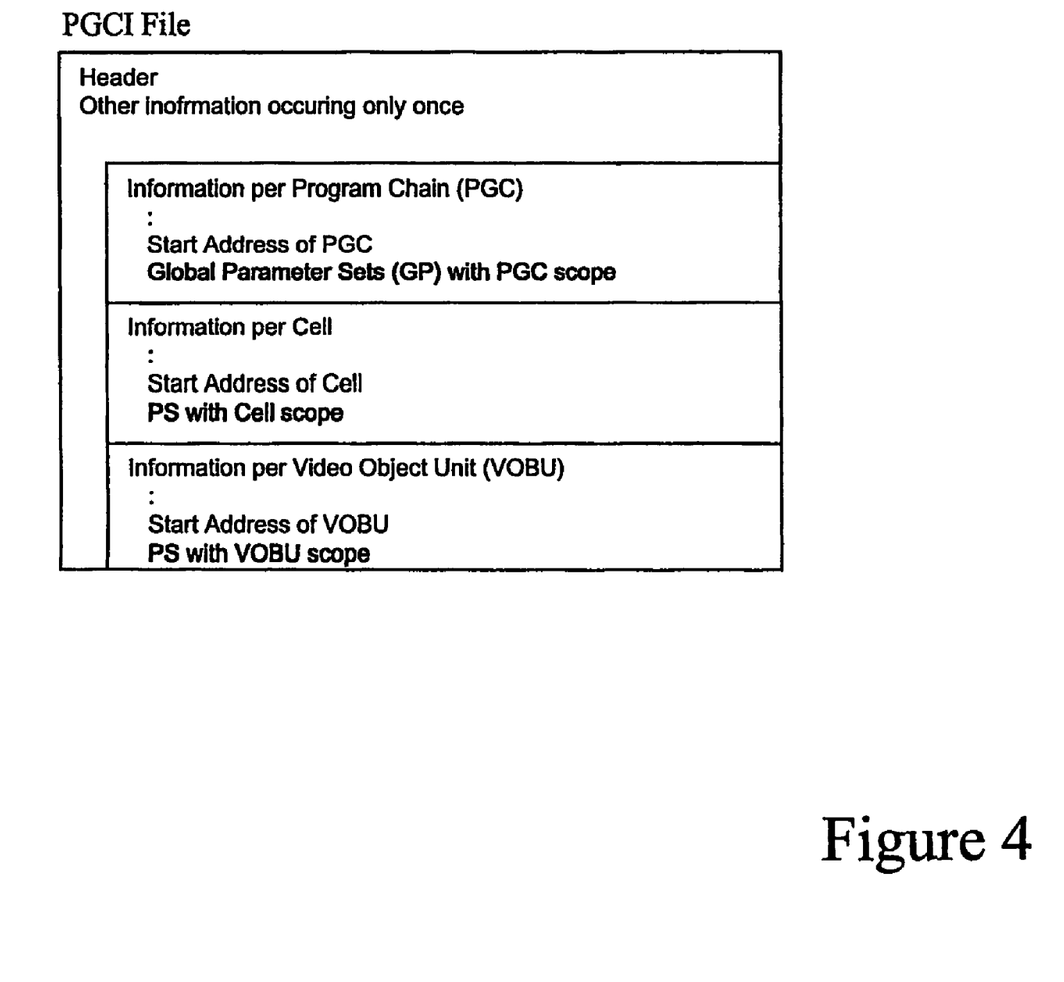
FIG. 4. the internal structure of PGCI Files extended to encompass parameter sets.
Figure 5:
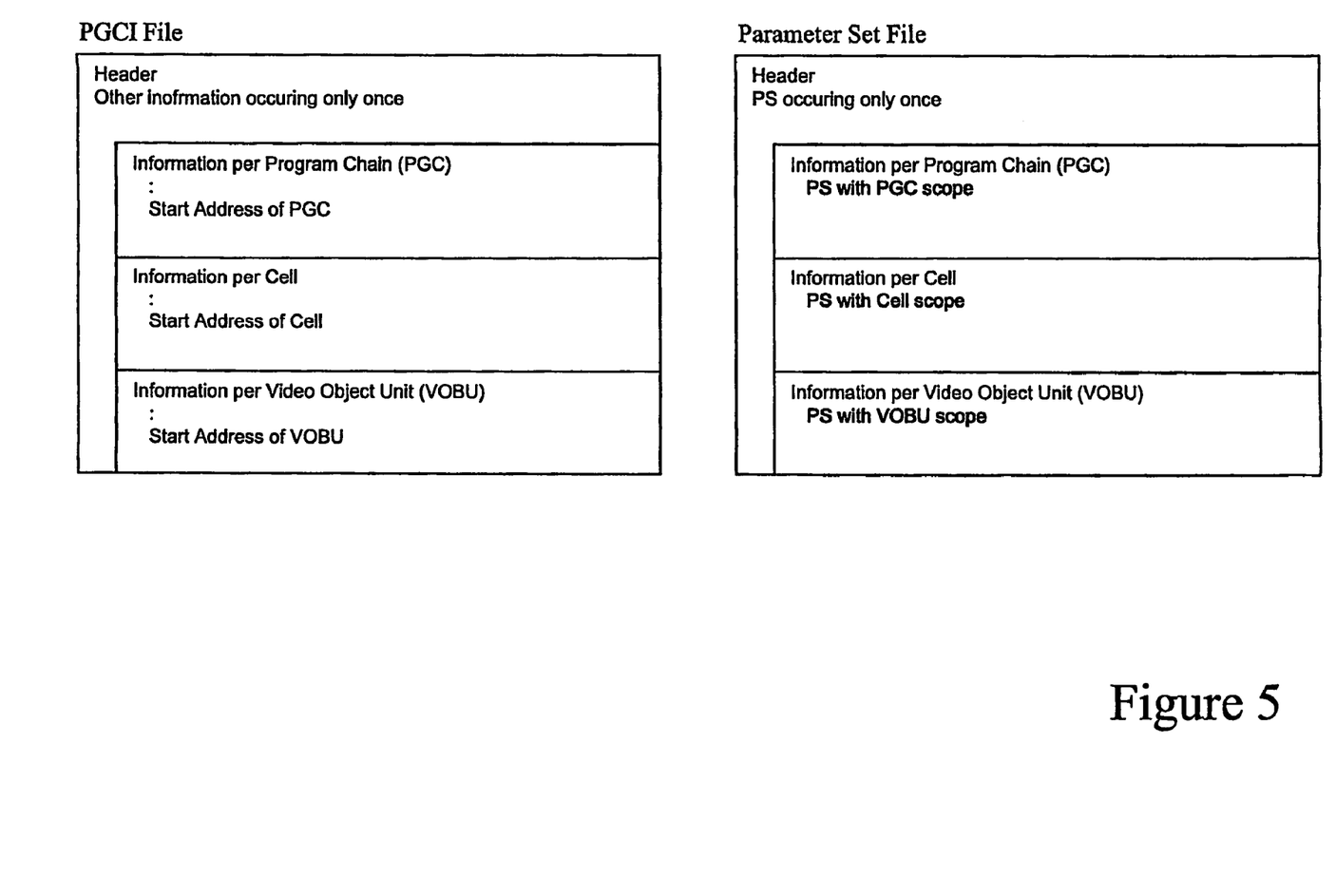
FIG. 5. the internal structure of PGCI File and a parallel File to encompass parameter sets.

Furthermore, either the PGCI files may be extended as defined in DVD by including the compression parameter sets directly in them (FIG. 4) or, advantageously in order to maintain compatibility with existing DVD players, to create separate files with an internal structure analogous to that of the PGCI files but just containing the compression parameter sets (FIG. 5).

Figure 6:
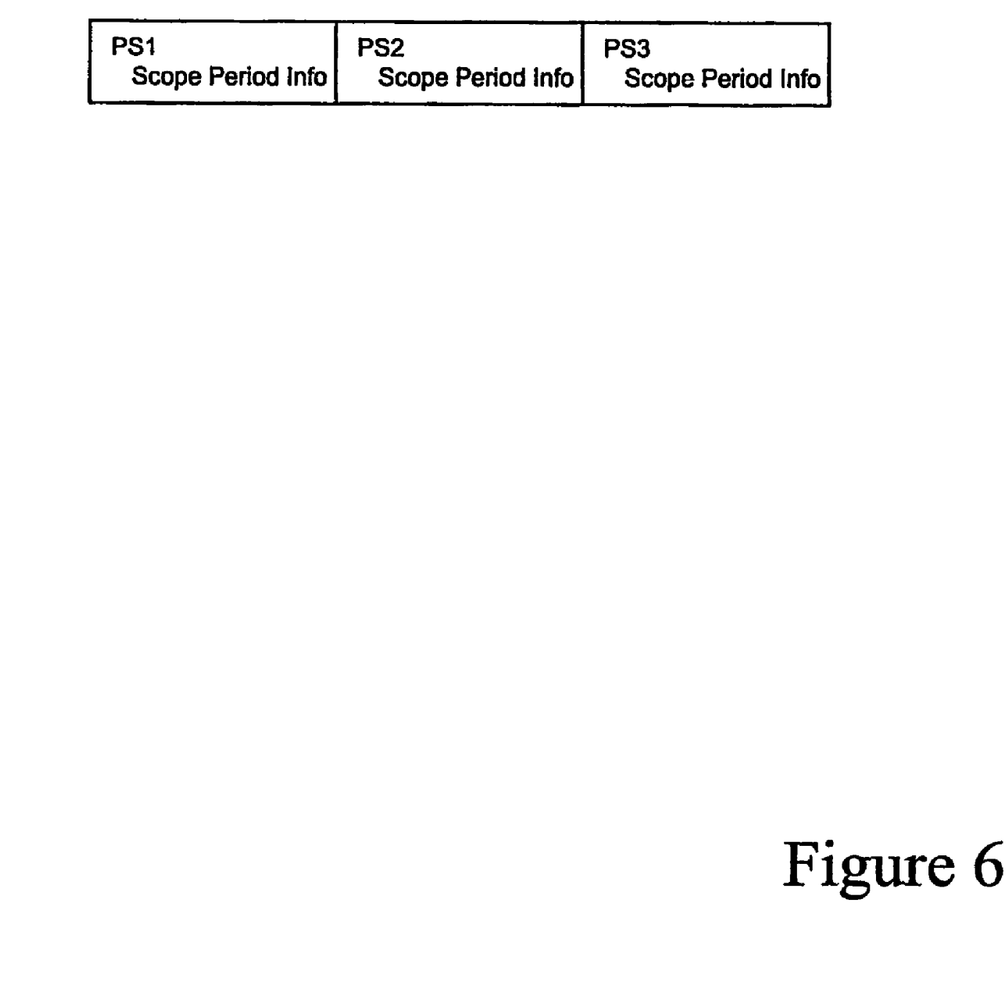
FIG. 6. parameter Sets with Scope Period information added.

During authoring, different parts of a Program Chain may have been encoded separately prior to recording on a storage medium. In that case, it is very likely that, between these parts, the same parameter set identifier happens to be assigned to different parameter sets. In order to support easy authoring of such compound content, explicit identification about the scope period of the parameter set identifiers may be added. It is not a good option to add such identification to the AV bit stream where compression parameter sets are being referenced, since that would require more parsing of the bit stream and would increase the bit rate. Therefore, it is proposed to amend each compression parameter set or groups of such parameter sets as stored in out-of-band files with information specifying its scope period (FIG. 6). Such scope period information can be based on the time stamps within the AV material, on file names identifying different parts of the AV bitstream (VOB files on DVD), or on sector numbers on the disc.

Figure 7:
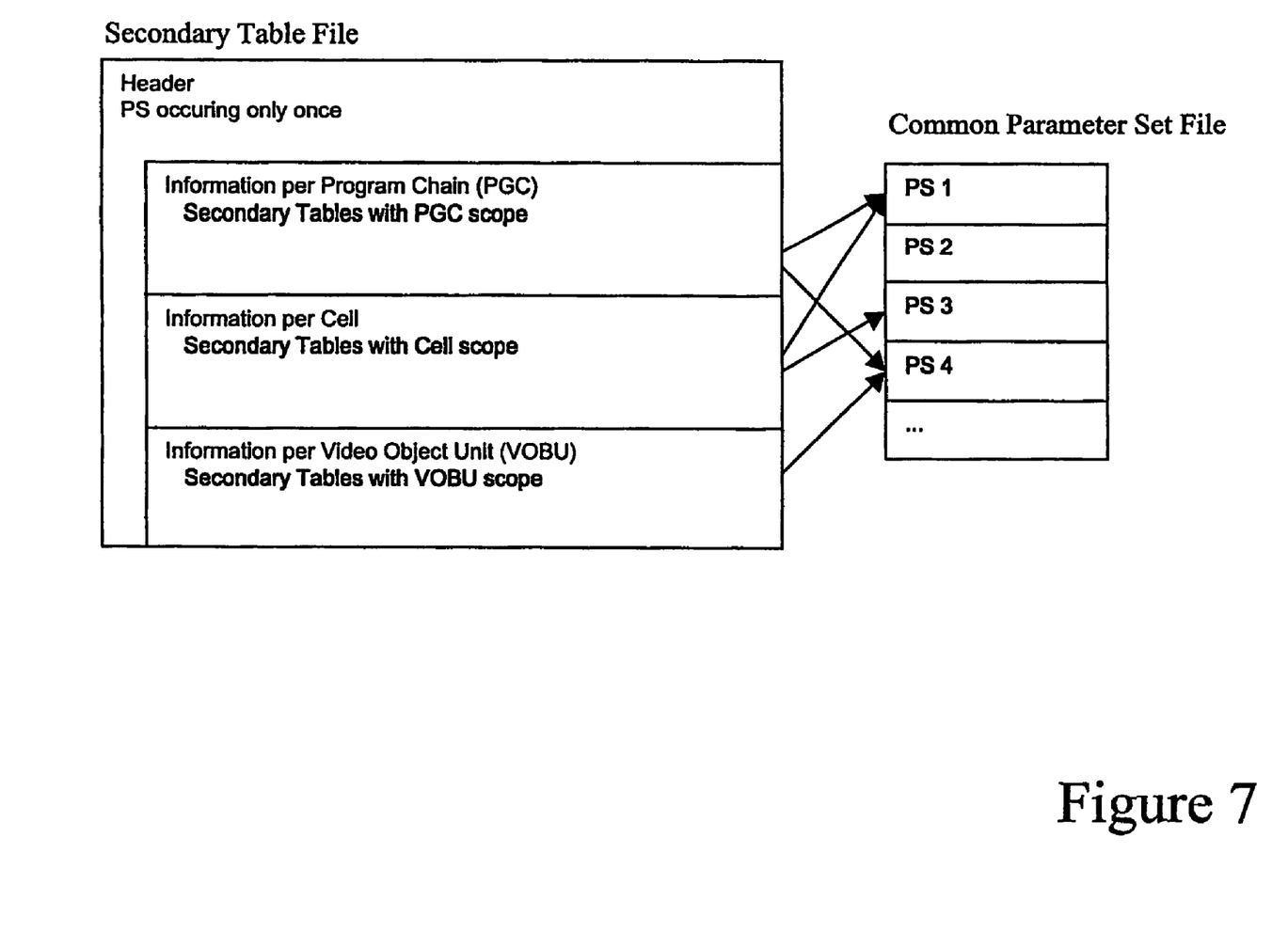
FIG. 7. an indirect referencing mechanism.

In cases of compound content as described above, although parameter set identifier assignment is likely to vary between separately encoded parts of an overall AV material, it is nevertheless likely that many if not all of these parameter sets, despite bearing different identifiers, are actually identical; since the employed encoding equipment may internally use and choose from a limited set of predefined parameter sets. In this case, as another way to avoid unnecessary repetition of compression parameter sets, it is additionally proposed to employ an indirect mechanism of referencing parameter sets, where the parameter set identifiers in the AV bitstream of each part are defined to be referring to a small secondary table individually available per each part, where this secondary table is stored in the out-of-band files in a data structure which is repeated per each part, and where the entries of all the secondary tables of the overall AV material are defined to be themselves identifiers referring in turn to entries of a common parameter set table provided once (FIG. 7).

The invention has the advantage of ease of formatting authored AV bitstreams onto a storage medium as well as bit rate efficiency. It is expected that authoring tools will store the parameter sets separate from the bit stream of AV data, as this is the original goal of the usage of parameter sets. Each parameter set needs only be stored once and can be referenced multiple times from any coded picture on the storage medium. Employing an indirect referencing scheme, parameter set management remains efficient even if AV assets come from heterogenious sources.

The invention is especially useful for transport or storage of AV bit streams. However, the invention is also applicable to other kinds of bit streams.

The invention claimed is:

1. Video coding method practiced by a video encoder and using a number of compression parameter sets being referenced from within coded data, wherein said compression parameter sets are stored in auxiliary data files that are uniquely associated to a file or stream containing a main Audio Visual (AV) bit stream, and wherein identifiers of said compression parameter sets and the corresponding references to these identifiers in the main AV bit stream are unique within said auxiliary data files and associated file or stream containing the main AV bit stream
- indirectly referencing said compression parameter sets by said video encoder,
- defining the parameter set identifiers in the AV bit stream of each of a set of parts of AV material being to refer to entries of a secondary table by the video encoder;
- storing said secondary table in auxiliary files in a data structure which is repeated per each said part so said secondary table is individually available per each said part by the video encoder;
- defining entries of all said secondary tables of said AV material to be themselves to refer in turn to entries of a common parameter set table provided once per said AV material by the video encoder.

2. Video coding method according to claim 1, wherein the validity period of said compression parameter set identifiers is explicitly signaled.

3. Video coding method according to claim 2, wherein the signaling of the validity period of the compression parameter set identifiers is based on the presentation or decoding time information associated to portions of the main AV bit stream.

4. Video coding method according to claim 2, wherein the signaling of the validity period of the compression parameter set identifiers is based on the file names associated to portions of the main AV bit stream.

5. Video coding method according to claim 2, wherein the signaling of the validity period of the compression parameter set identifiers is based on an existing identification of the underlying transport or storage entities, such as packets or sectors, associated to portions of the main AV bit stream carried therein.

6. Video coding apparatus using a method according to claim 1.

7. Video decoding method for decoding a video signal coded according to claim 1.

8. Video decoding apparatus using a method according to claim 7.

9. Video coding method according to claim 1, wherein existing auxiliary data files related to said file or stream containing the main AV bit stream are extended to carry said compression parameter sets.

* * * * *

UNITED STATES PATENT AND TRADEMARK OFFICE
CERTIFICATE OF CORRECTION

PATENT NO. : 7,623,573 B2  Page 1 of 1
APPLICATION NO. : 10/522089
DATED : November 24, 2009
INVENTOR(S) : Herpel et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1333 days.

Signed and Sealed this

Twenty-sixth Day of October, 2010

David J. Kappos
*Director of the United States Patent and Trademark Office*